United States Patent [19]

Lundstrom et al.

[11] 4,022,287
[45] May 10, 1977

[54] PERCUSSION DRILL BIT

[75] Inventors: Hans Per Olof Lundstrom; Harry Arthur Wiredal, both of Sandviken, Sweden

[73] Assignee: Sandvik Aktiebolag, Sandviken, Sweden

[22] Filed: Apr. 20, 1976

[21] Appl. No.: 678,555

[52] U.S. Cl. .................................. 175/393; 285/18; 285/332; 285/390; 403/334; 403/343
[51] Int. Cl.² ..................................... E21C 15/00
[58] Field of Search ... 175/393, 340, 320, 414–420, 175/422; 289/600, 587; 285/332, 355, 390, 18; 403/343, 334

[56] References Cited

UNITED STATES PATENTS

| 1,849,066 | 3/1932 | Bridges | 285/390 X |
| 3,062,306 | 11/1962 | Hjalsten | 175/418 X |
| 3,213,951 | 10/1965 | Eeles | 175/414 |
| 3,876,234 | 4/1975 | Harms | 285/332 |

FOREIGN PATENTS OR APPLICATIONS

| 566,114 | 1/1933 | Germany | 403/343 |
| 541,417 | 1/1932 | Germany | 403/343 |

Primary Examiner—Ernest R. Purser
Assistant Examiner—Richard E. Favreau
Attorney, Agent, or Firm—Pierce, Scheffler & Parker

[57] ABSTRACT

The invention relates to a drill bit for use in percussion drilling. The drill bit has a solid bit body, has cutting members on its face and a centrally disposed rod-receiving hole in its rear portion. The hole has, in part, a conical internal surface and a cylindrical internal surface in front of said conical internal surface. Said cylindrical internal surface is provided with an internal thread at a distance remote from the bottom of the hole. A cooperating drill rod has a forwardly tapering portion with a conical exterior face complementary to the conical interior surface in the hole of the drill bit and an external thread on its forepart.

7 Claims, 7 Drawing Figures

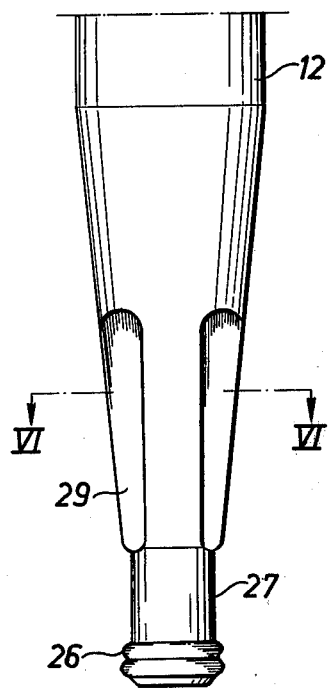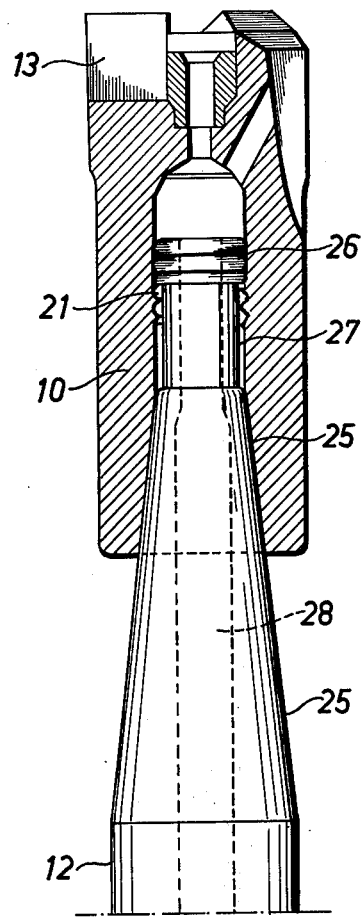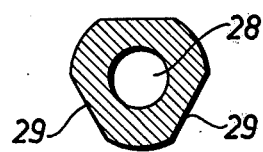

PERCUSSION DRILL BIT

The present invention relates to a drill bit for use in percussion drilling, the front end of which is provided with one or more cutting inserts of cemented carbide fastened in a slot or slots in the drill bit, the rear end of said drill bit being provided with a central bore for fastening the drill bit to a drill rod, said drill rod having a forwardly tapering portion having a conical exterior surface and said central bore in said drill bit having a rearwardly tapering matching conical internal surface for supporting said drill bit on said drill rod by engagement between said conical surfaces.

Such so-called "conbits" are already known in the art, but have hitherto been of disadvantage due to insufficient frictional engagement between said conical portions of the drill bit and the drill rod. The result has oftentimes been that the bit and the rod become disengaged the bit remaining in the drill hole thereby causing much trouble. An earlier suggestion for solving this problem was to provide the conical portion of the rod with recessed portions. This solution had the substantial drawback that the rod becomes weakened which increased the risk for failure incidence.

According to the present invention there is provided a drill bit which alleviates the abovementioned disadvantages. To this end there is provided a "conbit" with which, instead of making a conical engagement different from what was previously known, additional engageable means is provided between said drill bit and said drill rod. For that purpose the drill rod portion is terminated by an exteriorly threaded portion, and a matching interior thread is provided in the bore of the drill bit. Due to this embodiment said bit and rod portions are safely engaged against relative axial movement. At the same time there is achieved an easily disengageable connection.

Details of the invention appear in the following specification taken with the accompanying drawings, in which FIG. 1 is a side view of a drill bit according to the invention;

FIG. 5 is a side view of another embodiment of the drill rod;

FIG. 6 is a section on line VI—VI of FIG. 5; and

FIG. 7 is a longitudinal section of the drill bit in engagement with the drill rod according to the embodiment shown in FIG. 4.

Figure 1:
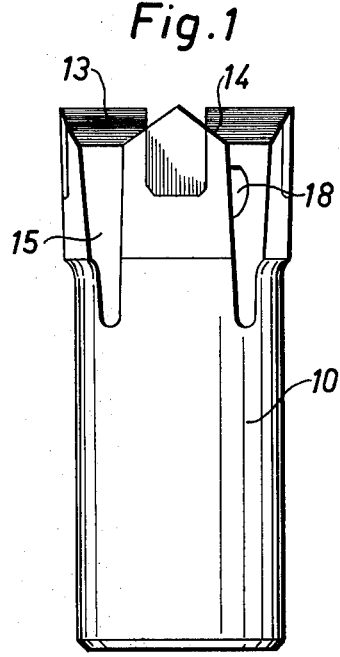
Figure 2:
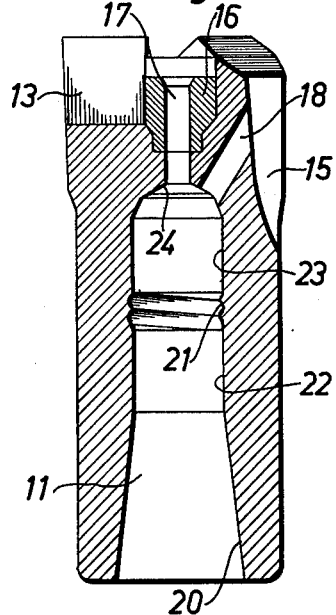
FIG. 2 is a longitudinal section of the drill bit shown in FIG. 1.
Figure 3:
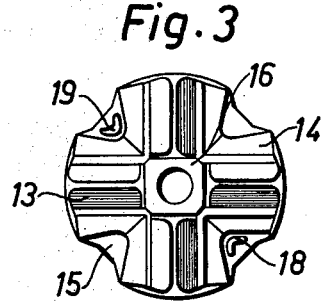
FIG. 3 is an end view of the drill bit shown in FIG. 1.
Figure 4:
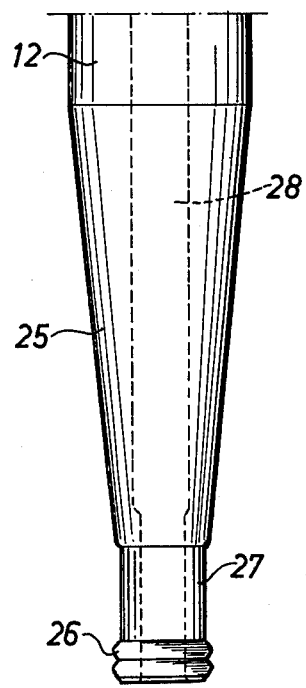
FIG. 4 is a side view of one embodiment of the drill rod.

The drill bit according to the invention comprises a drill bit body 10 of solid structure, the rear end (i.e., the end remote from the working face) of which has a central bottomed hole 11 for fastening the drill bit to a drill rod 12.

At its front end the drill bit is provided with four crosswise arranged cutting inserts 13 of cemented carbide, which inserts are fastened in slots in the face of the drill bit. The number of inserts can, of course, be varied from a single chisel insert to more than four inserts, and the position of the inserts can also be varied. For the removal of drill cuttings, recesses 14 are provided between the inserts, which recesses adjoin rearwardly tapering exit channels 15. A central plug 16 is arranged for supporting the inserts. A flushing channel 17 extends axially from the bottom 24 of hole 11 through said plug and to the face or front surface of the drill bit. In addition to this channel, the drill bit is provided with two auxiliary diverging channels 18 and 19 extending.

The central bottom hole 11 in the drill bit has an interior conical portion 20 and a cylindrical fore portion in front of said interior conical portion 20, said cylindrical fore portion being provided with an interiorly provided thread 21 at said cylindrical fore portion. The thread 21 is suitably rounded, forming a wave shaped longitudinal section. The thread 21 is located at a distance from the bottom 24 of the hole 11 such that cylindrical portions 22 and 23 of substantially equal length are provided on opposite sides of the thread 21.

The drill rod part 12 has an exterior conical portion 25 matching the internal conical portion 20 in the drill bit hole 11 thereby providing a frictional engagement therebetween. The drill rod is, at its foremost part, provided with an external thread 26 matching the internal thread 21. This external thread 26 of the drill rod is separated from the exterior conical portion 25 by a cylindrical portion 27. The latter portion 27 is of such length that when the conical surfaces 20 and 25 are in engagement with each other, the external thread 26 is situated axially in front of the internal thread 21, so that the threads are out of engagement with each other. This provides a safe and easily detachable coupling between the parts 10 and 12. A centrally provided channel 28 in the drill rod serves the purpose of transporting flushing medium to the fore part of the drill bit.

It has been found desirable to make the length of internal thread 21 approximately one half of the length of cylindrical portion 23. This positively adds to the duration of the drill bit because the stresses occurring in the fore part of the drill bit then are distributed more advantageously. It has also been found that this contributes to better resistance against transversal ruptures that usually occur at the bottom 24 of the central hole 11.

According to an alternative embodiment, the exterior conical portion 25 of the rod part may be provided with a number of plane surfaces 29. It has been found that this feature contributes to increased frictional engagement between the drill bit 10 and the drill rod 12: it also leads to a lessened risk of friction martensite appearing in the conical engaging surface layers that otherwise would result in decreased strength of the parts.

We claim:

1. A drill bit for use in percussion drilling comprising a solid bit body having one or more cutting edges at its front end and a centrally disposed rod-receiving hole having in part a conical internal surface, said hole being bottomed in the drill bit and comprising a cylindrical internal surface in front of said conical surface, said cylindrical surface having an internal thread located at a middle portion of the cylindrical internal surface of said hole, the length of the internal thread in longitudinal section being about one half the length of the cylindrical internal surface disposed axially in front thereof.

2. A drilling assembly for use in percussion drilling comprising a solid drill bit having one or more cutting edges at its front end and a centrally provided hole, and a drill rod having a forwardly portion tapering with a conical external surface, said central hole in the drill bit having a matching conical internal surface for supporting said drill bit on said drill rod by engagement between said conical surfaces, said drill rod having an external thread on the forepart thereof, said central hole being bottomed in the drill bit and comprising an internal cylindrical surface in front of said internal conical surface, said internal cylindrical surface having an internal thread matching said external thread on the foremost part of said drill rod, said external thread on said drill rod being positioned axially in front of said internal thread and at a distance from the bottom of said hole in the drill bit when said drill bit is in operating position and having its internal conical surface engaged with the exterior concial surface on the drill rod.

3. A drilling assembly as defined in claim 2, wherein said internal thread is disposed at a middle portion of the internal cylindrical portion and axially in front of said internal conical surface.

4. A drilling assembly as defined in claim 2, wherein the drill rod has a cylindrical portion between its external thread and its exterior conical surface, and wherein a flushing channel extends axially through the drill rod.

5. A drilling assembly as defined in claim 2, wherein the length of the internal thread in longitudinal section is about one half of the axial length of the cylindrical internal surface provided axially in front of it.

6. A drilling assembly as defined in claim 2, wherein a plurality of longitudinally extending planar surfaces symmetrically provided around said exterior conical surface on said drill rod.

7. A drilling assembly as defined in claim 2, wherein a flushing channel extends axially from the bottom of the bit hole to the front surface of the drill bit, and wherein two exit channels and two diverging auxiliary channels extend from the bottom of the bit hole into exit channels provided exteriorly of the bit.

* * * * *